(12) United States Patent
Shyu et al.

(10) Patent No.: US 8,077,411 B2
(45) Date of Patent: Dec. 13, 2011

(54) LENS DISPLACEMENT MECHANISM USING SHAPED MEMORY ALLOY

(75) Inventors: San-Woei Shyu, Taipei (TW); Shr-Bin Wu, Taipei (TW); Chih-Hsiung Huang, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/010,406

(22) Filed: Jan. 24, 2008

(65) Prior Publication Data

US 2011/0102920 A1     May 5, 2011

(51) Int. Cl.
*G02B 7/02* (2006.01)
(52) U.S. Cl. ............ 359/823; 359/820; 396/89; 396/97; 396/133; 348/373; 348/374; 60/527; 60/528
(58) Field of Classification Search .................. 359/814, 359/823, 824, 557; 396/89, 97, 348; 600/160, 600/168, 179; 60/527, 528; 348/65
See application file for complete search history.

(56) References Cited

U.S. PATENT DOCUMENTS

| | | | |
|---|---|---|---|
| 6,307,678 B2 * | 10/2001 | Kosaka et al. | 359/557 |
| 6,516,146 B1 * | 2/2003 | Kosaka | 396/55 |
| 7,613,389 B2 * | 11/2009 | Suzuki et al. | 396/89 |
| 7,703,281 B2 * | 4/2010 | Kosaka et al. | 60/529 |
| 2009/0295986 A1 * | 12/2009 | Topliss et al. | 348/374 |

* cited by examiner

Primary Examiner — Loha Ben
(74) Attorney, Agent, or Firm — Muncy, Geissler, Olds & Lowe, PLLC

(57) ABSTRACT

A lens displacement mechanism using shaped memory alloy (SMA) applied to an auto-focusing lens module is disclosed. The lens displacement mechanism comprising at least one SMA wire. Two opposite ends of the SMA wire are fixed and a longitudinal mid-point of an intermediate movable portion between the two opposite ends is tightened and is fixed on a corresponding hook disposed on an outer edge of the lens so that the intermediate movable portion is tightened between the two opposite ends. When the SMA wire is heated, the intermediate movable portion contracts to pull the hook of the lens for driving the lens to move and slide along with an optical axis so as to achieve auto-focus control. The present lens displacement mechanism is simple in structure and reflow process. Therefore, the present displacement mechanism is suitable to be used in portable camera or mobile phone or PDA, which needs to be small and have easily mass production by SMT.

8 Claims, 6 Drawing Sheets

LENS DISPLACEMENT MECHANISM USING SHAPED MEMORY ALLOY

BACKGROUND OF THE INVENTION

The present invention relates to a lens displacement mechanism using shaped memory alloy (SMA), especially to a lens displacement mechanism that uses SMA to control forward/backward movement of the lens for zooming and such mechanism is applied to an auto-focusing lens module.

Portable electronic devices such as digital cameras, mobile phones with camera function, or notebooks available now are generally disposed with auto-focusing (AF) compact camera, so called with auto-focusing lens module inside. The auto-focusing lens module primarily consists of a housing, a lens and a lens displacement mechanism. The lens is consists of a lens holder and a lens group. The lens holder and the lens group are mounted in the housing. The lens displacement mechanism is used for driving the lens in moving along an optical axis or toward/away from an object side by sliding or screw rotation for auto-focus control. A conventional lens displacement mechanism is composed of a piezoelectric motor that is formed by piezoelectric material. However, the general piezoelectric material is unable to endure high temperature of a reflow process. Once a special piezoelectric material that is durable to high temperature is used, the cost is quite expensive. As to another component, a voice coil motor (VCM), it uses magnetic force and includes elastic parts. But, under high temperature of the reflow process, the voice coil motor may be damaged or the magnetic force is reduced. Thus the reflow process is not used while assembling the piezoelectric motor or the voice coil motor. Therefore, this leads to difficulty in mass production. Furthermore, a SMA device formed by shaped memory alloy is used. By its principle of heat contraction and cold expansion, the lens is driven to move. The contraction and expansion amount of the SMA device is about 5%, far more effective than that of general material. Moreover, SMA device is durable to high temperature of the reflow process so that the reflow process can be applied when assembling the auto-focusing lens module. Therefore, the SMA device is practical and the assembling efficiency is improved.

Referring to patents of U.S. Pat. No. 5,185,621, U.S. Pat. No. 5,279,123, U.S. Pat. No. 5,459,544, U.S. Pat. No. 6,307,678, U.S. Pat. No. 6,449,434, US2002/0136548, US2007/0058070, US2007/0047938; WO2005/001540; Japan patents JP64-000938, JP09-127398, JP62-067738, JP03-196781, JP2006-329111, JP2005-275270, JP2005-195998, JP2005-156892, JP2004-184775, JP2004-129950, JP2004-069986, JP2004-038058, JP2000-056208; Taiwan patents TWM242178, TW200710464 and so on, all are prior arts relative to SMA devices in lens displacement mechanisms. Although they all use SMA devices as driving sources of lens displacement, the technique or driving way disclosed are different from one another. However, most of them have complicated design and large volume so that they can't match requirement of compact design of the lens modules. Referring to U.S. Pat. No. 6,449,434, a SMA wire is used. The two ends of the SMA wire is fixed and an intermediate moveable portion is hooked on a pivoted actuator. A projective pin is arranged on the outer edge of the actuator for locking with a slot on an outer edge of the lens holder as a stress point. By heating contraction and cold expansion of the SMA wire, the actuator is driven to pivot at an angle. Synchronously, the projective pin is also pivoted so as to drive the lens holder pivot at an angle. Thus by other element, the lens holder moves so as to achieve focusing. It is found that driving force is from the SMA wire, these prior arts still require some other linkage devices such as actuators, triggers or other leverage with similar functions to drive the lens holder in moving. The linkage device is disposed between the SMA wire and the lens holder so that contraction force of the SMA is converted into driving force for movement of the lens holder through the linkage device. Thus the movement and structure of the lens displacement mechanism are too complicated and this leads to negative effects on design requirements of compact lens module and low cost as well as has disadvantageous in mass production by SMT (Surface-Mount Technology). Therefore, there is still a space for improvement.

SUMMARY OF THE INVENTION

Therefore, it is a primary object of the present invention to provide a lens displacement mechanism applied to an auto-focusing lens module. At least one shaped memory alloy (SMA) wire is arranged around the lens symmetrically or in equal distance. Two opposite ends of the SMA wire are fixed and a longitudinal mid-point of an intermediate movable portion between the two opposite ends is tightened and is hooked on a corresponding hook disposed on an outer edge of a lens holder so that the intermediate movable portion is tight compared to the two opposite ends. When the SMA wire is heated due to the control current rush-in, the intermediate movable portion contracts so as to pull the hook for driving the lens to move and slide along with the optical axis. Therefore, auto focusing is achieved.

It is another object of the present invention to provide a lens displacement mechanism using shaped memory alloy that further includes a recovery spring element disposed on the lens. When the control current is cut off, the SMA wire is cooled and expanded back to original length. Then the recovery spring element provides the lens a recovery force that is opposite to a pulling force of the contracted SMA wire so as to drive the lens back to original place and auto focusing is achieved.

It is a further object of the present invention to provide a lens displacement mechanism using shaped memory alloy that includes a guide slot and a corresponding guide rail arranged between the lens and edges of a housing so as to make the lens move and slide stably inside the housing.

DETAILED DESCRIPTION OF THE PREFERRED EMBODIMENT

A lens displacement mechanism using shaped memory alloy of the present invention is applied to an auto-focusing lens module. There is no restriction on shape or structure of a housing or the lens of the lens module. For example, the lens may include either a single lens or lens group having a plurality of lens. The single lens or lens group can be set in a fixing member and then is assembled with a lens holder to form a lens. There is also no limit on the lens holder as long as it can fit with a cover, an inner space, the housing or other components of the lens module. As to number of shape memory alloy (SMA) wires and lens being driven thereby, there is also no restriction. There are many driving ways such as a lens is driven by a SMA wire, a plurality sets of SMA wires drive a lens, or a plurality sets of SMA wires drive a plurality of lenses.

Figure 1:
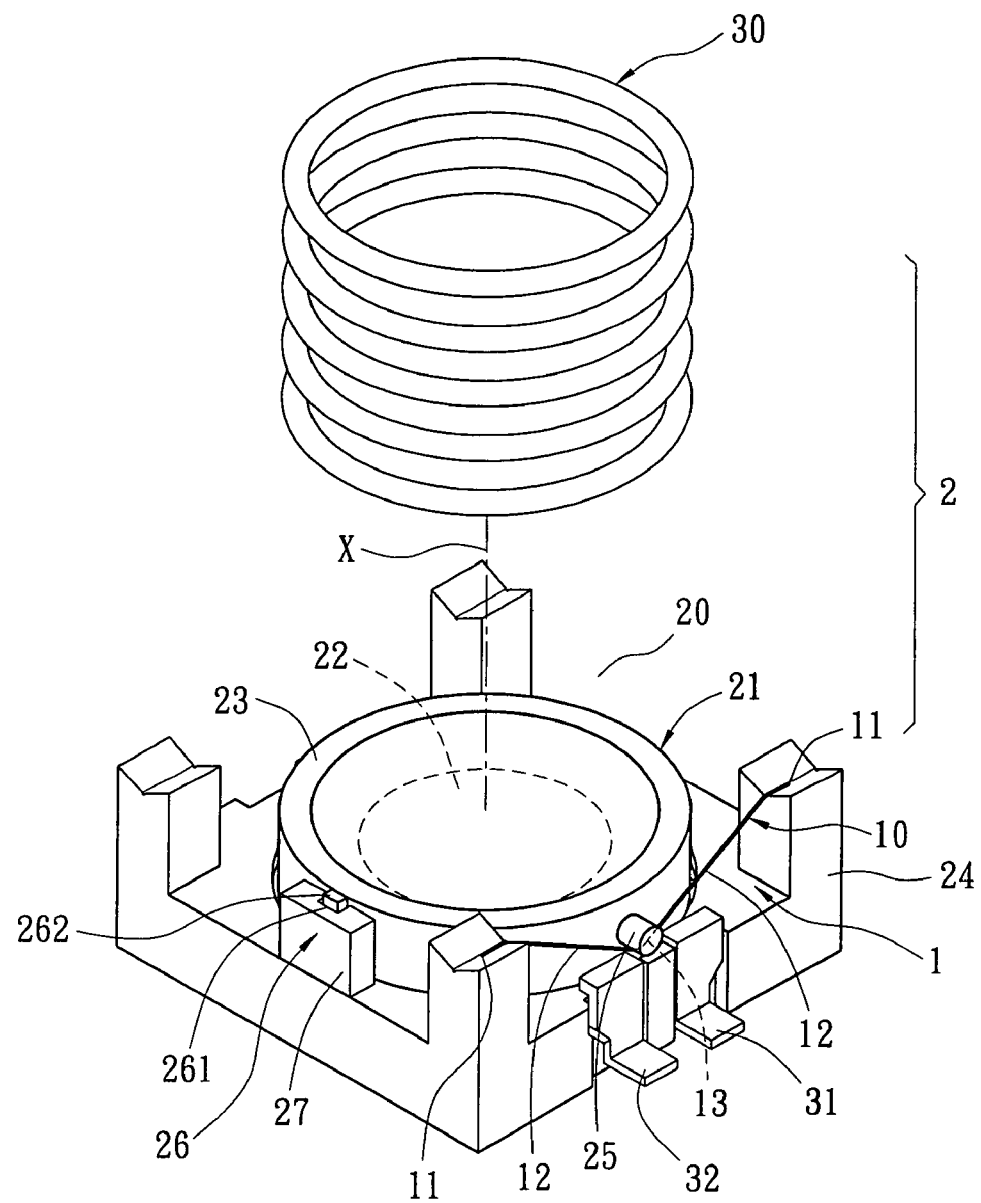
FIG. 1 is a perspective view of an embodiment according to the present invention.
Figure 2:
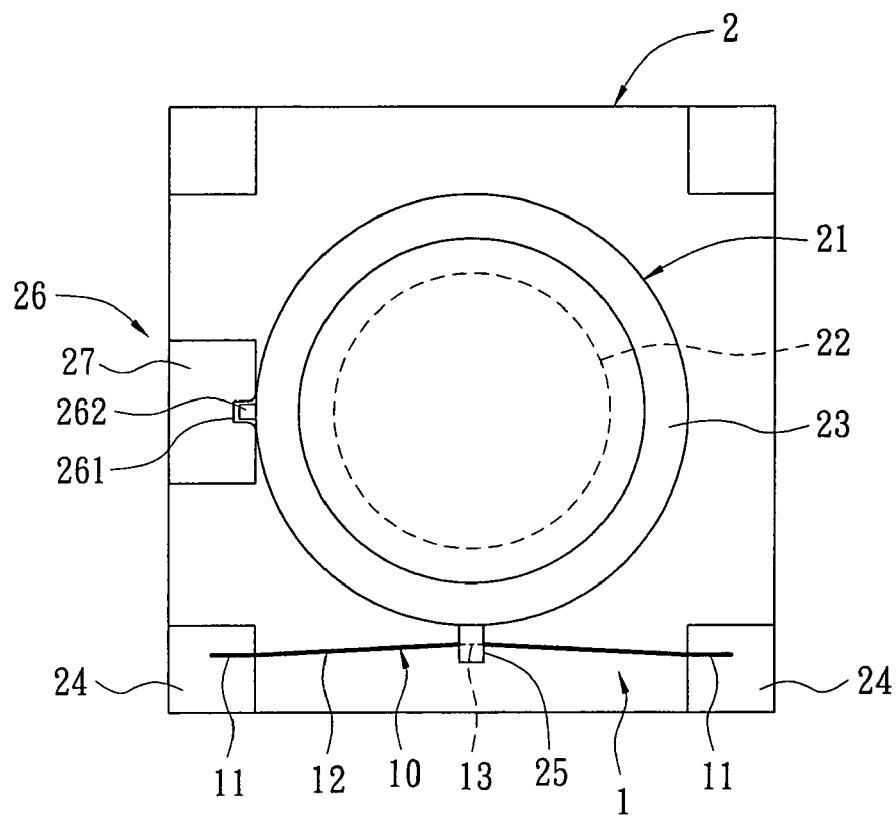
FIG. 2 is a schematic drawing showing top side of the embodiment in FIG. 1.
Figure 3:
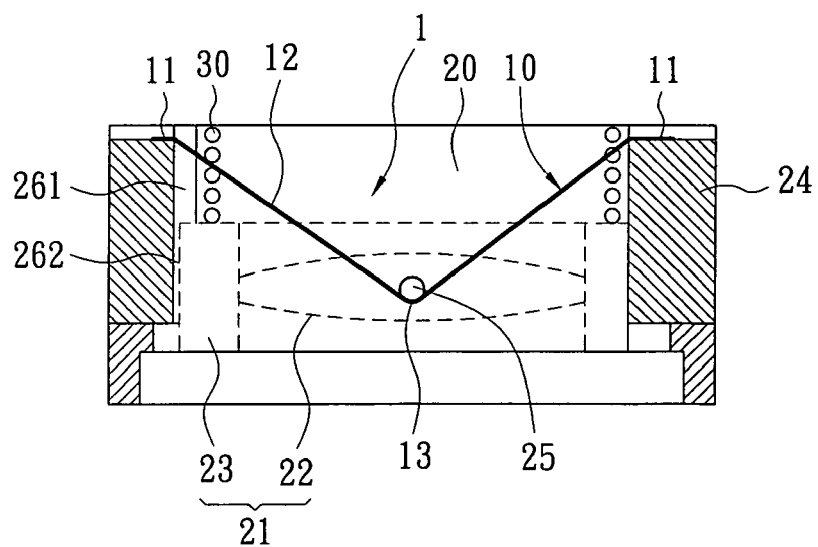
FIG. 3 is a schematic drawing showing lateral side of the embodiment in FIG. 1.

Referring to FIG. 1 to FIG. 3, a lens displacement mechanism 1 of the present invention is applied to an auto-focusing lens module 2. The auto-focusing lens module 2 includes at least a housing 20 for mounting a lens 21 that moves along an optical axis X thereof. There is no restriction on structure or assembling way of the lens 21. Generally, the lens 21 consists of a lens group 22 having a single lens or a plurality of lenses (such as two lenses) and a lens holder 23.

In the lens displacement mechanism 1, the lens 21 is driven to slide and move by at least one SMA wire 10 with features of temperature change as well as heat contraction and cold expansion after being conducted. Where the SMA wire 10 is the characteristic of martensite/austenite transformation when the SMA wire 10 is heated by control current rush-in achieving the heating-contracting behavior between austenitic start temperature and austenitic finish temperature, is cooled by current cut-off achieving the cooling-expansion behavior between martensite start temperature and martensite finish temperature.

The SMA wire 10 includes two opposite ends 11 and an intermediate moveable portion 12 located between the two opposite ends 11. The two opposite ends 11 are fixed on somewhere such as a frame 24 surrounding the housing 20 of the auto-focusing lens module 2. There is no limit on fixing way of the opposite end 11 to the frame 24. The fixing way can be clipping, adhesion, or welding as long as it's an easy processing. A longitudinal mid-point 13 of the intermediate moveable portion 12 is tightened and is hooked on a corresponding hook 25. The hook 25 is disposed on the outer edge of the fixing member of the lens group 22 or the outer edge of the lens holder 23 so as to make the intermediate moveable portion 12 become tight between two opposite ends 11. In accordance with above structure, when the SMA wire is heated due to the control current rush-in, the intermediate moveable portion 12 of the SMA wire 10 contracts to pull the hook 25 so that the lens 21 is driven to slide and move along the optical axis X. Thus auto focusing is achieved.

The number of the SMA wire 10 in the present invention and the way of arranging each SMA wire 10 around the lens 21 are not restricted. The number of the SMA wire 10 may be one, two or four in different embodiments.

The First Embodiment

Referring to FIG. 1 to FIG. 3, one SMA wire 10 is used in this embodiment. When zooming from tele to wide, the lens 21 is moved away from the image side and towards the object side. While zooming, the lens 21 moves under control of a focus button (not shown in figure). When user presses the focus button, the lens displacement mechanism 1 gets control current passed from electrodes 31, 32. After a control current passing through the SMA wire 10, joule heat generates due to resistance of the SMA wire 10. Thus the SMA wire 10 is heated and contracted. Due to linear relationship among the length, temperature and the control current of the SMA wire 10, displacement of the lens 21 can be controlled according to contraction of the SMA wire 10. Thus the distance between the lens 21 and an image-forming plane is changed so as to achieve auto focusing. In this embodiment, the SMA wire 10 is made from Nickel-Titanium alloy with diameter of 0.002". The distance change between the lens 21 and the image forming plane as well as the control current is shown in the table I.

TABLE I

| Object distance(mm) | 70 | 100 | 600 | 1000 | infinity |
|---|---|---|---|---|---|
| Move of lens (mm) | 0.243 | 0.167 | 0.023 | 0.011 | 0 |
| control current (mA) | 50 | 35 | 20 | 15 | 0 |

There is no restriction on power supply structure and/or electrical connection of the lens displacement mechanism 1 of the present invention.

The lens displacement mechanism 1 further includes a recovery spring element 30 such as spring or clip disposed on the lens 21. When the control current is diminish, the SMA wire 10 is cooled down and expanded back while the recovery spring element 30 provides a recovery force opposite to the pulling force of the contracted SMA wire 10. That means direction of the recovery force is opposite to displacement direction of the lens 21 pulled by the contraction of the intermediate moveable portion 12 so that the lens 21 turns back to the balance place. As to types of the recovery spring element 30, it can be compression spring, or extension spring, and there is no restriction on numbers or disposed positions in figures, on top of the lens 21 so as to provide the lens 21 a compression spring force that is in opposite direction to the pulling force of the contracted SMA wire 10. Or an extension spring is arranged on bottom of the lens 21 for providing the lens 21 an extension spring force opposite to the pulling force of the contracted SMA wire 10 so as to move the lens 21 back to the original place.

Furthermore, a set of guide rail device 26 is disposed between the lens 21 and the housing 20. The guide rail device 26 includes a guide slot 261 and a corresponding guide rail 262 respectively arranged between the housing 20 and the frame 27 close to or connected with the lens 21 so that the lens 21 moves and slides stably inside the housing 20 by the guide rail device 126. The position and number of the guide rail device 26 have no limits.

The Second Embodiment

Figure 4:
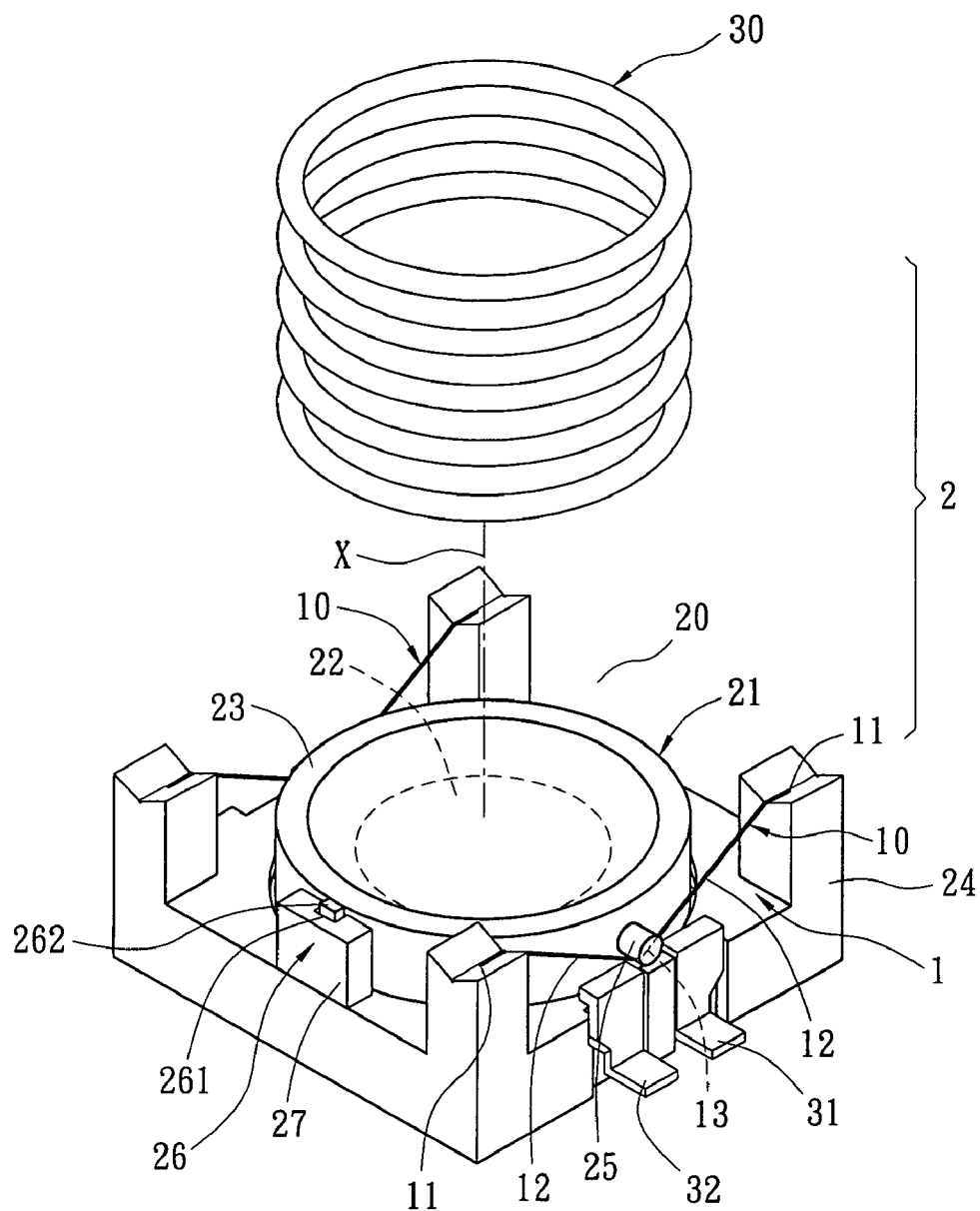
FIG. 4 is a perspective view of another embodiment according to the present invention.
Figure 5:
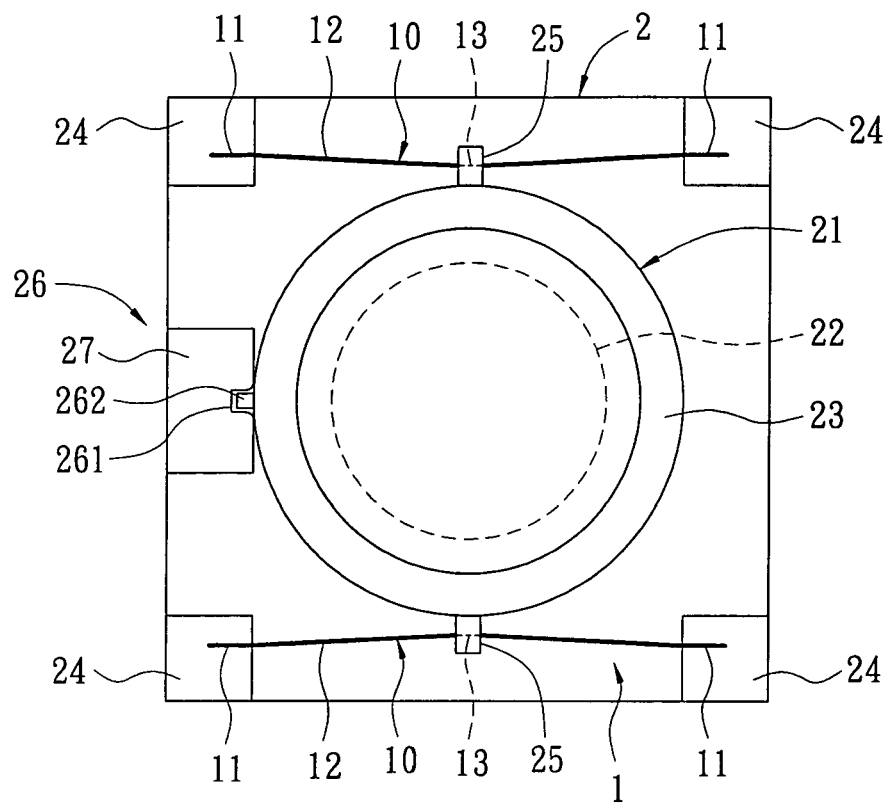
FIG. 5 is a schematic drawing showing top side of the embodiment in FIG. 4.
Figure 6:
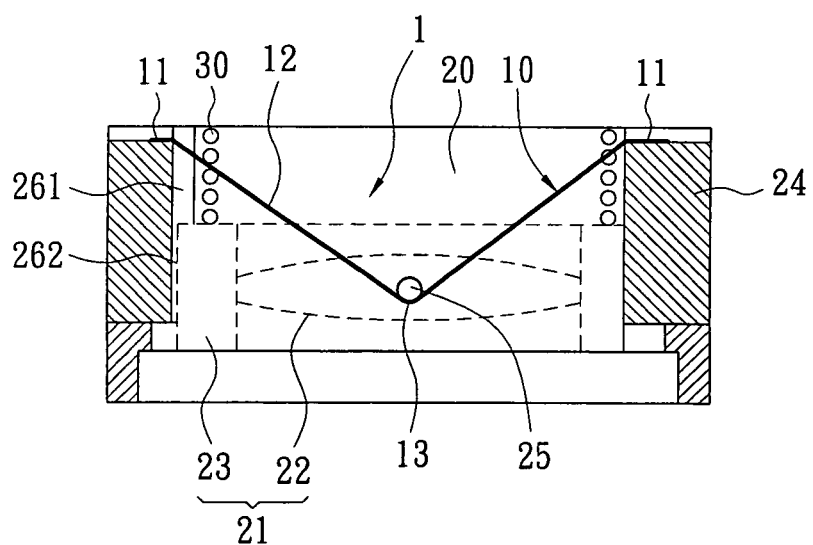
FIG. 6 is a schematic drawing showing lateral side of the embodiment in FIG. 4.

Referring to FIG. 4 to FIG. 6, this embodiment includes two SMA wires 10. The two SMA wires 10 are arranged symmetrically or in equal distance around the lens 21. The . driving way and function of each SMA wire 10 is the same with that in the first embodiment. A recovery spring element 30 is disposed on the lens 21 for providing a recovery force in opposite direction to the pulling force of the contracted SMA wire 10 so as to turn the lens 21 back to a balance place.

Furthermore, a guide rail device 26 is disposed between the lens 21 and the housing 20. The guide rail device 26 is arranged on one side between the two SMA wires 10 so that the lens 21 moves and slides stably inside the housing 20 by the guide rail device 26.

Figure 7:
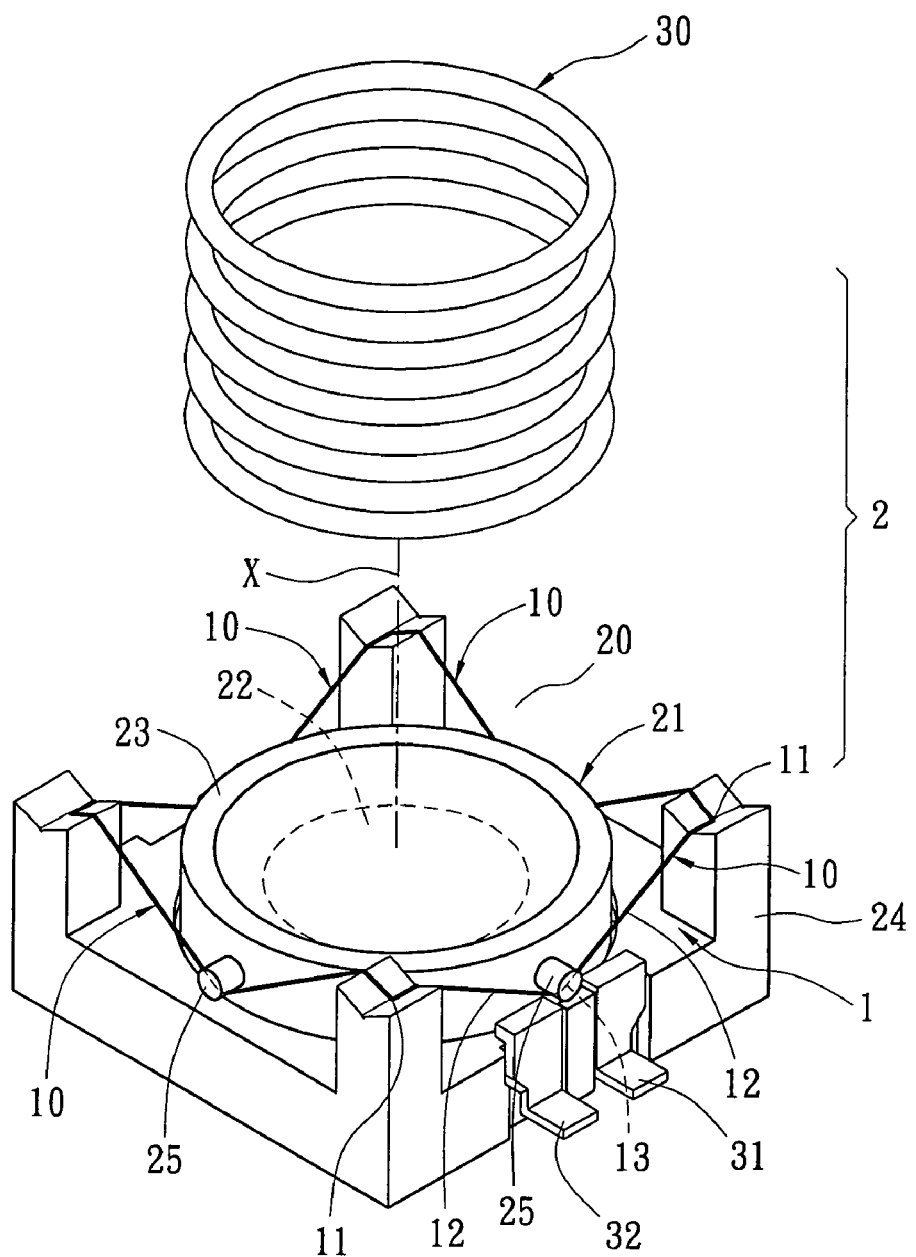
FIG. 7 is a perspective view of a further embodiment according to the present invention.
Figure 8:
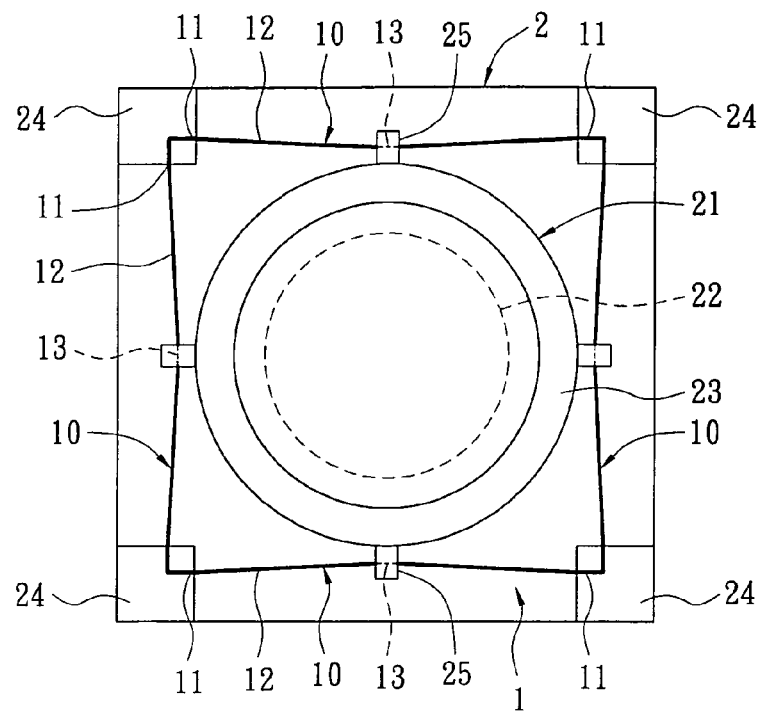
FIG. 8 is a schematic drawing showing top side of the embodiment in FIG. 7.
Figure 9:
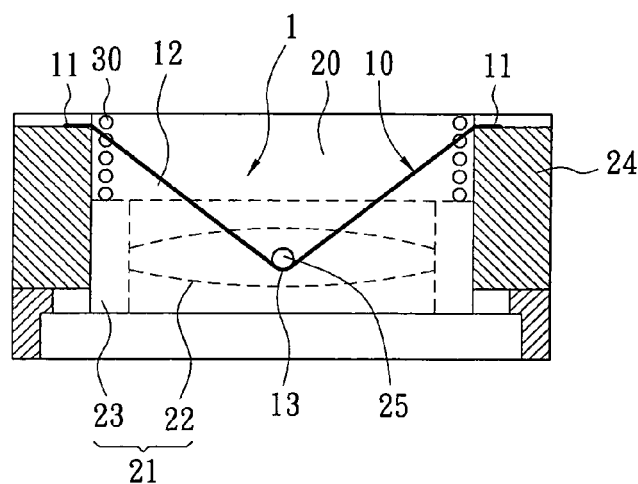
FIG. 9 is a schematic drawing showing lateral side of the embodiment in FIG. 7.

Or two guide rail devices 26 are disposed between the lens 21 and the housing 20. The two guide rail devices 26 are arranged symmetrically in accordance with positions of the two SMA wires 10. As shown in FIG. 4 to FIG. 6, the two SMA wires 10 are disposed symmetrically while the two guide rail devices 26 are arranged symmetrically (not shown in figure). The two SMA wires 10 and the two guide rail devices 26 may also be arranged next to each other. For example, the two SMA wires 10 are arranged on two adjacent sides of the rectangular frame while the two guide rail devices 26 are disposed on the remaining two adjacent sides. The purpose of disposition of the guide rail device 26 is to make the lens 21 move and slide stably inside the housing 20. Generally, the two SMA wires 10 of the second embodiment provide better pulling force than one SMA wire 10 of the first embodiment The Third Embodiment Referring to FIG. 7 to FIG. 9, this embodiment includes four SMA wires 10. The four SMA wires 10 are arranged symmetrically or in equal distance around the lens 21. For example, the SMA wires 10 respectively are arranged on four sides of the lens 21. The driving way and function of each SMA wire 10 are the same as those in the second embodiment. Moreover, a recovery spring element 30 is disposed on the lens 21 for providing a recovery force in opposite direction to the pulling force of the contracted SMA wire 10 so as to turn the lens 21 back to balance place.

In this embodiment, four SMA wires 10 respectively are disposed on four sides surrounding the lens 21 so as, to provide the lens 21 equipollent contacting and pulling forces. Thus, the lens 21 moves stably inside the housing 20. Basically, there is no need to add the guide rail devices 26 in this embodiment. Furthermore, once an image quality feedback mechanism is added to control and regulate the four SMA wires 10 for fine adjustment of a tilt of the lens 21, the image quality is improved.

Compared with prior arts, the present invention has following advantages:

(1) The SMA wire 10 of the present invention drives the lens 21 to move and slide directly without other linkage device such as actuators and triggers so that structure and movement of the lens are simplified. Thus, requirements of compact lens module and reduced cost are satisfied and this has positive effect on mass production.

(2) The present invention can endure high temperature of the reflow process so that is has higher possibility to be mass-produced.

(3) The longitudinal mid-point 13 of the intermediate moveable portion 12 of the SMA wire 10 according to the present invention is tightened and hooked on a corresponding hook 25 of the lens 21 so that the SMA wire 10 forms a V-shaped structure and a longer range can be obtained. That means by the same SMA wire 10, the same SMA wire 10 of the present invention provides the lens 21 larger displacement range. Moreover, a feedback mechanism on the circuit is used to control the length—temperature-resistance of the SMA wire 10 for fine adjustment of displacement of the lens 21. The focusing position of the lens is controlled precisely.

(4) Once at least two SMA wires 10 are arranged symmetrically or in equal distance surrounding the lens 21 as shown in the third embodiment, a suitable image quality feedback mechanism is used so as to control each SMA wire 10 respectively for correcting tilt, yaw or pitch of the lens 21.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An auto-focusing lens module, comprising:
   a housing;
   a lens having a lens group;
   a lens holder holding the lens arranged in the housing and along an optical axis; and
   a lens displacement mechanism, also arranged in the housing, for moving and sliding the lens towards or away from an object side for auto-focusing, the lens displacement mechanism comprising:
   at least one shaped memory alloy (SMA) wire; wherein the at least one SMA wire having two opposite ends and an intermediate movable portion between the two opposite ends is controlled by a control current to drive the moving and sliding lens, the two opposite ends being fixed and a longitudinal mid-point of the intermediate movable portion being hooked on a corresponding hook arranged on an outer edge of the lens holder so as to tighten the intermediate movable portion between the two opposite ends, and wherein when the at least one SMA wire is heated by control current, the intermediate movable portion contracts to pull the hook so as to drive the moving and sliding lens along the optical axis for auto-focusing.

2. The lens displacement mechanism as claimed in claim 1, wherein at least one pair of SMA wires are symmetrically arranged surrounding the lens, or are arranged surrounding the lens at equal distance from each other, and the two opposites ends of each SMA wire are fixed while the intermediate movable portion of each SMA wire is being tightened and hooked on the corresponding hook.

3. The lens displacement mechanism as claimed in claim 1, further comprising a recovery spring element is-disposed on the lens so that when the control current is diminished, wherein when the SMA wire is cooled and expanded back, the recovery spring element provides the lens a recovery force that is opposite to a pulling force of the contracted SMA wire so as to drive the lens back to a relax position.

4. The lens displacement mechanism as claimed in claim 1, wherein the two opposite ends of the SMA wire are fixed on a frame situated on an outer edge of the housing of the lens module.

5. The lens displacement mechanism as claimed in claim 4, wherein the two opposite sides-ends of the SMA wire are fixed by clipping, adhesion or welding.

6. The lens displacement mechanism as claimed in claim 1, further comprising a guide rail device is disposed between the lens holder and the housing.

7. The lens displacement mechanism as claimed in claim 6, wherein the guide rail device comprises a guide slot and a guide rail, corresponding to and assembled with each other with the guide rail and the guide slot being respectively disposed on a frame situated on an outer edge of the housing of the lens module and on an outer edge of the lens holder.

8. The lens displacement mechanism as claimed in claim 6, wherein the guide rail device is at least one set of guide rail device.

* * * * *